(12) United States Patent
Anderson et al.

(10) Patent No.: US 6,826,483 B1
(45) Date of Patent: Nov. 30, 2004

(54) PETROLEUM RESERVOIR SIMULATION AND CHARACTERIZATION SYSTEM AND METHOD

(75) Inventors: Roger N. Anderson, Palisades, NY (US); Albert Boulanger, Palisades, NY (US); Wei He, Palisades, NY (US); Jody Winston, Palisades, NY (US); Liquing Xu, Palisades, NY (US); Ulisses Mello, Yorktown Heights, NY (US); Wendell Wiggins, Houston, TX (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/687,813

(22) Filed: Oct. 13, 2000

Related U.S. Application Data

(60) Provisional application No. 60/159,252, filed on Oct. 13, 1999.

(51) Int. Cl.[7] .............................................. G01V 1/28
(52) U.S. Cl. ........................................... 702/13; 702/14
(58) Field of Search .............................. 702/12, 13, 14, 702/16; 367/73

(56) References Cited

U.S. PATENT DOCUMENTS

| | | | | |
|---|---|---|---|---|
| 5,959,547 A | * | 9/1999 | Tubel et al. | 340/853.2 |
| 6,012,016 A | * | 1/2000 | Bilden et al. | 702/12 |
| 6,434,435 B1 | * | 8/2002 | Tubel et al. | 700/30 |
| 6,519,568 B1 | * | 2/2003 | Harvey et al. | 705/1 |

* cited by examiner

Primary Examiner—Donald McElheny, Jr.
(74) Attorney, Agent, or Firm—Baker Botts LLP

(57) ABSTRACT

A single intranet, internet, or World Wide Web-accessible interface is provided for, initiation of, interactive adjustments to, and access to the outputs of an integrated workflow of a plurality of analytical computer applications for characterization and analysis of traits and optimal management of the extraction of oil, gas, and water from a subsurface reservoir. By combining disparate analytical application tools in a seamless and remotely accessible, package, incompatibility problems caused by the disparate nature of petroleum analysis methods is reduced. The assumptions, analytic processes, and input data used for one analysis may be readily retrieved and re-evaluated for that reservoir or for future evaluations of the same or other reservoirs. Thus a flexible database of analysis tools and data may be implemented for access, input, and output of workflow and analytical data in the field, in conjunction with standard main computer servers, software and plug-ins, and portable remote computers.

27 Claims, 1 Drawing Sheet

US 6,826,483 B1

PETROLEUM RESERVOIR SIMULATION AND CHARACTERIZATION SYSTEM AND METHOD

This application claims the benefit of, and incorporates by reference in its entirety, U.S. Provisional Patent Application No. 60/159,252, filed Oct. 13, 1999.

BACKGROUND OF THE INVENTION

The present invention relates to systems and methods for the evaluation and modeling of mineral reservoirs, and in particular to methods and systems for providing in a single, remotely-accessible computer middleware and interface for the efficient movement of disparate data and processing outputs among and between several software applications used for the comparative analysis and prediction regarding the characteristics over time of withdrawal of petroleum reservoir fluid (crude oil, gas, and water) using any or all among seismic, well logs, production data and other geological, geophysical, and petroleum engineering data and analyses that might be relevant.

In the petroleum exploration and production sector, a priority is placed on gaining accurate knowledge and analysis regarding the characteristics and changes over time of petroleum reservoirs (for instance, reservoirs of crude oil and/or natural gas) as oil, gas, and water are being extracted at the surface. Because petroleum deposits occur underground, often far below the surface of the Earth (one to several miles), and because the contents of a petroleum reservoir (for instance, an oil or gas field) may be dispersed throughout a spatially and geologically extensive and diverse underground region (the reservoir), the evaluation over time of petroleum reservoirs is a complex and economically essential task.

The goals of evaluating reservoirs are manifold and begin with the earliest stages of speculative exploration activity (at a point when it is not necessarily known whether a geologic region or structure contains accessible petroleum in commercially marketable quantities), through the production lifetime of an identified reservoir (when it may be important, for example, to evaluate and/or vary the best sites for placing wells to tap the reservoir, or the optimal rate at which petroleum may be removed from a reservoir during ongoing pumping). Because companies in the petroleum industry invest very large sums of money in exploration, development, and exploitation of potential or known petroleum reservoirs, it is important that the evaluation and assessment of reservoir characteristics be accomplished with the most efficient and accurate use of a wide range of data regarding the reservoir.

To this end, geologists, geophysicists, and petroleum engineers have developed numerous methodologies for assessing petroleum reservoirs (as to such parameters as total reserves, location of petroleum, pressure decline, water encroachment, gas dissolution, etc.). These methodologies have relied upon a wide range of software applications, to which are input data variables regarding the geological character of the reservoir and how these data variables vary over the time of production.

Many of these data variables can be gauged most readily by analysis of seismic data—i.e., data obtained by analysis of the characteristics of sound waves travelling through and reflected from underground geological structures. Because, as is well known, sound travels with different speeds through different substances—e.g., fluid filled, porous rock of different densities—seismic analysis of sound waves caused to travel through a petroleum reservoir can be used to characterize that reservoir in terms of its heterogeneous constituent parts; e.g. the various solid, liquid, etc. regions or components of the reservoir and their respective locations within the reservoir can be mapped as they change over time. The term SeisRes may be used generally throughout herein to refer to data and processes for characterizing petroleum reservoirs (typically by seismic means), though it must be understood that input physical data other than, or in addition to strictly seismic data can be and is used in evaluating, analyzing, and forming characterizations of subsurface regions and petroleum reservoirs. The present invention is particularly useful for, but is not limited to, characterization techniques focusing in large part on seismic data; it can also manage and optimize characterization using other types of data inputs. Reservoir evaluation and characterization generically (including but not limited to that using seismic, non-seismic, and hybrid data analysis) will be referred to herein as SeisRes OF. The middleware and interface system we call the operating framework, henceforth abbreviated (OF).

Obviously such data may be of use in, for instance, confirming and characterizing the location of, say, liquid petroleum within the reservoir, thus potentially easing greatly its quantification and extraction.

Because Exploration & Production ("E&P") operations in the energy industry are worldwide, rural as well as urban, and highly technical, employing a diverse set of scientific, business and engineering data sets and software applications, improvements in efficiency of reservoir evaluation processes are exceedingly complex and difficult. While various computer-driven applications for analysis of petroleum reservoirs have been known, evaluation, quantification, and characterization of a given reservoir will almost always require analysis under more than one computer application. The key software applications (apps) have different sources, vendors, formats, languages, and data protocols. In many cases, the plurality of computer applications may be designed for disparate operating systems, may apply different processing algorithms or analytic assumptions, and may use input data and/or supply processed output data in formats (e.g., data input/output formats using different measurement units, benchmarks, time frames, or terminology, sets of variables) that are not consistent with the respective data formats used by another computer analysis application being applied to the same reservoir. Hence, while useful computer analysis applications have been known, the process of feeding raw input data about a reservoir into the disparate applications (which in some cases may involve feeding partially- or fully-processed data or results from one application into another application for further processing), and thereafter of efficiently processing by the plurality of applications to obtain preliminary output data or characterizations of the petroleum reservoir (i.e., of the state, location, and volume quantity of substances within the reservoir, specifically of petroleum fluids), and finally of integrating output data indicative of such characterization from the plurality of applications in such fashion that errors in characterizations and inconsistencies between characterizations are minimized and the most comprehensive and accurate picture of the OF may be formed, has not been simply accomplished.

We refer to the process of providing an integrated characterization of output data from the plurality of analytical applications as "optimization," a process that involves reconciling and/or minimizing errors among application outputs (which may consist of partial or entire approximate characterizations of the reservoir). In the past, when inconsistent characterization-related data was obtained from different analytic applications, the inconsistencies were not always readily resolved. Often, the only resolution that could be achieved was a human expert's choice among the inconsistent or disharmonious outputs, or by labor-intensive adjustment of incompatible types of data associated with each application, and feeding such adjusted data into a further processing step. The prior art has not contained a satisfactory system and method for creating and managing an automated workflow process to integrate many analytic computer applications and their handling, processing, and output of data relative to a reservoir in such fashion that: (a) data handling is largely automated; (b) disparate analytic applications are integrated or "wrapped" in a common user interface, which may be made remotely available; (c) workflow or processing hierarchies among the applications may be adjusted readily; (d) characterization data from the multiple applications is optimized, on an automated basis, to allow access to an accurate aggregate OF; and (e) the history of not only the data and the OF, but of the analytic workflow applied to reach such characterization, is stored and made available for immediate retrieval so that historical profiles of not only the approximated reservoir traits, but of the assumptions used to reach such approximation, are readily available and may be updated, re-run, and reevaluated using different assumptions or analytic metrics.

SUMMARY OF THE INVENTION

The invention disclosed and claimed herein is a system and method for managing and optimizing handling and analysis over a period of time of data relative to a characterization of the state, location, and quantity of fluids within a subterranean petroleum reservoir. The invention disclosed herein allows for seamless integration of a number (potentially a large number) of disparate computer analytical tools for performing complementary or overlapping analytic tasks on reservoir data or subsets of the data (including on data that originated as the intermediate output of another of the plurality of analytic applications). Additionally, conflicts (whether in data formatting or handling regimes, or in characterization-related conclusions) among the various analytic applications may be minimized by an iterative process of optimizing the data and outputs associated with each of the different applications.

The present invention provides a networked operating framework ("OF") that sources, then integrates multi-vendor scientific, business and engineering applications and data sets. Our OF manages, versions, and coordinates execution of multiple applications. It handles the trafficking of data between applications; updates geospatially aligned earth and reservoir models, and pushes the outcomes through optimization loops. In one useful embodiment, the field user interfaces with our platform and other members of the interdisciplinary asset team through a World Wide Web-based "dashboard." The clients have access to real-time versions of multiple projects allowing 24-hour-by-7-day processing by virtual teams using distributed resources.

The internet, and high bandwidth data transmission in general, have made it possible for us to invent an operating infrastructure (which we refer to as a middleware framework) that allows, for the first time, very large volume data sets to be configured and efficiently transported among disparate geological, geophysical, and engineering software applications, the looping through of which is required to determine accurately the location over time of the oil and gas within the reservoir relative to the surrounding water in the rock matrix. Further, we have invented World Wide Web enabling software that tracks the progress of the workflow throughout the history of computation around the loop, including the versioning of the various data and results.

"Versioning" in this context refers to the software techniques for keeping track of, accounting for, and/or recording changes over time in the state of a set or sets of parameters, data, and data analysis outputs such that changes in the set or sets (or subsets thereof) can be traced longitudinally over time, reconstructed, and mapped for archival, analytic purposes over time. Specific provision must be made for tracking the instantaneous state of data sets and subsets at predetermined intervals (or by use of event markers corresponding to significant landmark steps within a workflow) because otherwise computer-manipulated and processed data, which may be continually updated, may not be amenable to analysis of data history or "pathological" tracing or reconstruction of errors, crucial data changes or workflow failures or timelines, or the causes and results of inaccuracies in assumptions or models applied through particular characterization-related applications.

DETAILED DESCRIPTION OF THE INVENTION

Figure 1:
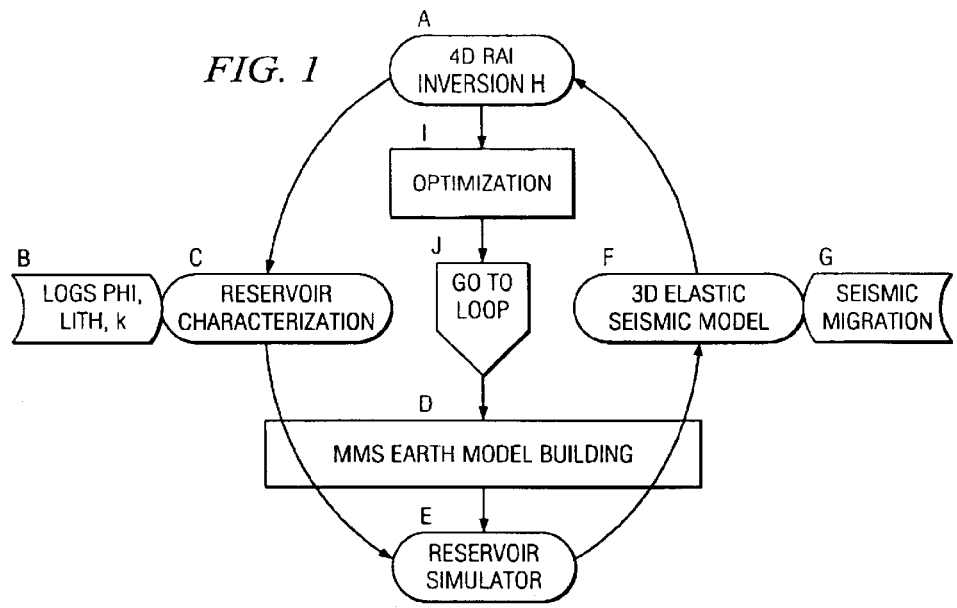
FIG. 1 provides a process overview of the four-dimensional (4D), i.e., time-dependent, processing loop for integration of analytical applications handling reservoir-related data, and for optimization of characterization results therefrom.

What was missing from the prior art was the computational Operating Framework (OF), or middleware, that would allow for the seamless and rapid communication between and among the varied software applications that is required for reservoir management. Not only must the reservoir stack be simulated from a fluid flow perspective, but the drainage changes must be fed into a three dimensional (3D), elastic seismic modeling program that can simulate seismic amplitude changes accurately enough to be realistically compared to real time-variable (four dimensional or 4D) seismic field data differences. An optimizer must then reconcile the differences between the time-lapse changes in the data from the disparate sources, seismic and otherwise. That is, the time-lapse differences between observed and computed seismic and fluid flow models and data must be computed and recomputed until they converge to the best view of the real changes occurring in oil and gas reservoir over time. The technique of one highly useful embodiment of our invention is illustrated in FIG. 1 and consists of the following labeled steps in which letter labels correspond to the respective lettered step in the Figure:

A. 4D seismic workflow for non-linear inversion of two 3D seismic volumes acquired at different times during the production history of a field, and their time-depth conversion, normalization and differencing (as will be more fully understood in light of the disclosure of U.S. Pat. No. 5,798,982 and 5,586,082, which are incorporated herein in full by reference) is used to compute seismic differences over time;

B. Well log preparation and depth-time conversion using a software application such as Sigma View from Landmark Graphics Corporation;

C. 4D OF of the two seismic volumes using geostatistical co-kriging software application such as EarthGM from Western Geophysical Corporation.

D. Export to the IBM MultiMesher for Earth Model building;

E. Fluid flow simulation in Eclipse from Schlumberger, VIP from Landmark Graphics, or any other comparable simulator;

F. A 3D elastic seismic modeling phase to generate 4D synthetic seismic cubes;

G. Export of the modeled seismic to a seismic modeling software application such as Omega from Western Geophysical for migration;

H. Differencing of 4D model-versus observed-seismic data and analysis of the difference-of-the-differences using 4D observed seismic difference software (e.g., that of RAI);

I. Optimization that identifies changes in physical properties of reservoirs to more closely match fluid withdrawal, pressure changes and seismic differences;

J. A "Go To" loop back to E, above.

Computation and characterization are never completed during the life of the reservoir because new data is continuously coming into the operating framework from monitoring of the oil or gas field itself, and because the extraction of the reservoir is a dynamic process that continually changes reservoir characteristics, sometimes in not-fully-predictable fashion.

Thus there is provided the first extensible, middleware computational operating framework that enables and versions data and interpretation workflow among the various commercially available software vendor applications needed to complete the loop from geological and geophysical interpretation to engineering implementation required by the modern oil and gas production.

EXEMPLARY SYSTEM ARCHITECTURE

The design and implementation of the present invention as practiced in one embodiment consists of C++ OF system code, and of scripts, wrappers, and implementation scripts. It is not necessary, however, to describe all of these elements in extreme detail, as a description of the system architecture will suffice for an understanding of the construction of the key components and their interrelation within the system.

Figure 2:
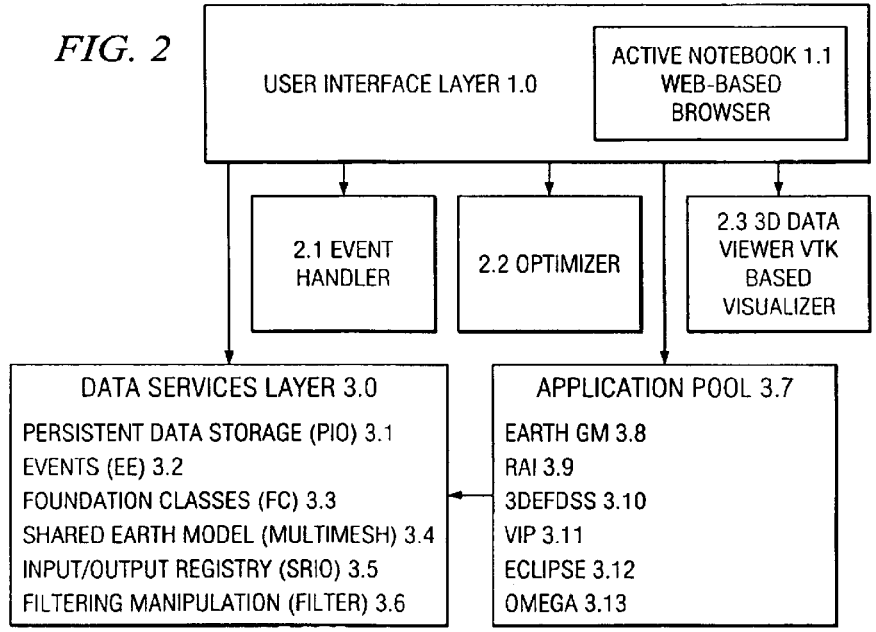
FIG. 2 provides an illustrative system architecture framework for illustrating the layers of input/output, processing, and optimization of OF-related data.

The architecture of the OF Operating Framework contains the following major components or modules, as shown in FIG. 2 and described below in conjunction with the workflow task they are assigned:

1. Control and track all activity within the OF using our web-based Active Notebook 1.1. A retrospective evaluation (or hind-cast) of previous runs can be quickly and easily reviewed because we version all input and output to each application using the Active Notebook 1.1. All transactions are timed, including computer cycles used throughout the WAN, so billing is quick and easy.

2. Provide a vendor-neutral data model with our object persistent input/output, PIO Data Repository 3.1 for our OF, that sits on top of the users various existing data management systems. We implemented our PIO Data Repository using fast and reliable TCP/IP, distributed objects, and low-level protocols like XDR. CORBA (or next generation systems like SOAP) still do not support native persistency, but we can manage PIO with them.

3. Provide access to vendor applications, not just vendor databases, using automated Wrappers. For example, we allow the user to choose between Eclipse (from Schlumberger) and VIP (from Halliburton's Landmark Graphics division) within our OF superstructure, just as you click on different programs on the Microsoft Windows OF on your PC desktop. We take care of the connectivity, meshing, data traffic, and versioning. We use "Swig" product to create interfaces for scripting Wrappers.

4. Provide an Event Handling Mechanism to make applications run asynchronously. We parse the workflow among several applications simultaneously and distribute them on the client/server network, then reassemble them as the complete rather than having to wait for one to finish before beginning another.

5. Provide a rich set of reusable, extensible Container Foundation Classes 3.3 for engineering, geological and geophysical data so that new applications and data types can be added to the OF management system easily and quickly.

6. We provide MultiMesh 3.4, a meshing system from IBM that is topological so that whatever the gridding requirements of an Application are, we can quickly deliver it.

7. We provide an Optimization Tool Kit 2.2 so that key parameters can be modified to converge on a least-error solution during the running of an application. The optimizer can be visualized over the web and changes to parameter settings for one application are propagated to others that use those same settings.

8. We provide the OF Data Viewer, a visualization system developed for us by VTK, a GE spinout company. The user can design the visualization of progress of his computer simulations over the Web and manipulate the images in real time as they are computing.

To illustrate further the forms in which the system architecture may be implemented, below follows a more detailed description of an embodiment of system architecture in which system layers, steps, and components are numbered in accordance with the corresponding number labels on the system architecture diagram provided in FIG. 2.

1.0 USER INTERFACE LAYER

Best-practices in the execution of science and engineering computations is to keep a notebook with a record of the experiment and its trail and errors (the modern version of the researcher's notebook). In performing a complicated task such as reservoir analysis and characterization, a "notebook" will necessarily have structure to it—broken down into sections describing the multiple tasks involved in the workflow and sub-investigations done along the way to complete the overall task. For OF, we implemented modern web technology to do a computer-based notebook. The notebook will capture the tasks (and all their attributes) of OF as they are being performed by the user. It is an Active Notebook 1.1 because the initiation and monitoring of OF tasks are done using this web technology. Past work in OF can be reactivated and investigations renewed using the notebook. The user interface to the broad set of OF tasks is the notebook.

It is a particularly useful feature of this invention that it may be used to establish user interface with the OF over any distributed data communications network. Quite usefully, such a network may include a private network, virtual private network, or a public network such as the Internet or world wide web. Using the internet, field users can have instantaneous, on-demand, and persistent interactive access to the reservoir characterization functionality of the of invention.

A variety of known networking protocols may be used in connection with the user interface. For instance, techniques for establishing encrypted secure remote access to host servers (over the internet or intranets) are well-established and could readily be used to establish data connection for the user interface.

Web Based Workflow

By combining the broadband information communication capabilities of the Internet with the strategic business processes automation and integration capabilities of OF Workflow Engine, significant improvement monitoring and control of the drainage of oil and gas from subsurface reservoirs can be realized. These enable a real acceleration of productivity improvement within information-related activities, and paves the way for totally new forms of work in the oil production industry. These include real-time monitoring, mobile work and virtual production enterprises.

The latter will be formed for the duration of a specific project and will build on the unique strengths of the user's physical location worldwide.

1.1 Active Notebook

The Active Notebook 1.1 are an integrated set or web pages generated by a web application server, Zope, that monitors and records OF tasks as they are being performed by the user. Past work in OF can be reactivated and investigations can be renewed using the Notebook. Thus, the industry has the capability of hind-casting computational tasks related to reservoir management using the Active Notebook 1.1. All parameters and data that went into a set of interpretations among the applications controlled by the OF can be recomputed, even if years have passed in the meantime Notebook Client.

The client supports computation orchestrated though the web browser. The Active Notebook 1.1 is based on using VTK as a tclet plugin. The browser has an interface to OF repository objects directly within the browser's scripting environments. These include, but are not limited to, tcl, Javascript, or JPython. The scripting environment in the browser has access to the browser's document object model (DOM). One such access is Netscape's LiveWire. The "thin" client runs in trusted mode when executing the visualization as well as when interfacing to the repository and event objects, since OF will be used in an intranet situation, initially. XML is used to transport structured data between the browser and the OF server. The browser makes use of embedded viewers that parse XML for viewing or parse the XML directly in their scripting. Embedded viewers can be script based (i.e. tclet), Java based, or pre-built as plugins. The client notebook supports an interface to authoring and status. We use the Zope authoring interface for this.

1.1.2 Notebook Server

The server tracks the workflow progress of a user and dynamically constructs new web content including client-side scripts based on user initiative, OF objects, and metadata about the state of workflow of the on-going OF experiment. Changes in state in the client are tracked with forms submission (http POST), cookies, and direct plugin communication with the server (for example, the ability for a tclet plugin to do http POST). The ultimate store of persistent data is the OF metadata store (in Zope and the OF data repository)—cookies are used, however, to stage persistent data to this store.

We use Apache as the http server. We run the python-based Zope under Apache as a way of dynamically publishing objects to the web. The idea is to use Zope objects to represent the workflow tasks and documents of OF. These objects represent task submission, monitoring, results, synopsis, and associated setup documents that contain submission forms for parameter files for example. Preparing OF documents will execute OF work tasks on the set of computational resources for OF work. Zope has a persistent object system so these documents are archived with the state of OF work though its work tasks. Zope uses a server side scripting language called DTML.

The main functionality of the server side scripting is to construct client-side scripts and web content that comprises 1. an interface to OF tasks dispatched from the OF Server to compute hosts using RSH; and
2. the generation of a client-side script that can generate visualization (VTK) pipeline network or a user interface on the not so-thin client for example.

The communication needs between notebook components and the OF server can be summarized as follows:

Applets/plugins see the DOM (Document Object Model)
Applets/plugins see each other
Server Side Scripting see the DOM
Applets/plugins post information to the server
Client-side Scripting and Applet/Plugins access Events and Repository objects directly using the Event and Repository servers. They communicate with Zope metadata using http POST and indirectly with server side scripting.

Good user interface design should heed issues like organizing the sum of workflows for the various OF experiments, the layout of menus, and user input widgets, plugins, applets, etc. Individuals approach complex tasks in different ways and the overall OF system needs to accommodate user-varying initiatives on work order, etc. as well as display best-practices from workflows used in similar circumstances elsewhere in the client's company.

To address these concerns we implemented two features:

1. We introduced a notion of "viewers": plugins, applets, etc. that have a careful but simple interface design that covers the major functions a user would do with the viewer. A viewer could be a seismic viewer with its intuitive interface to visualize seismic data. The parameter widgets and menus with the viewer have a layout that considers the human factors involved in a user visualizing seismic data. The viewer also functions as a control element. We use tclet plugins as the basis for the viewers.
2. We built a web document management and dissemination system in the notebook server. Explorer—(as in Windows) like interfaces and/or dataflow graphs are used to give the user a high level view of the notebook's contents with drilldown as well as steps to be executed in the workflow. The web application server, Zope, is used for the document management system.

2.2 Optimization Tool Kit

The Optimization Tool Kit 2.2 is designed to be a set of tools can be deployed at any time and any place within the OF to provide parameter estimation services. It is implemented as a loosely-coupled component because the need for parameter estimation varies from app to app. The principle underlying this choice of design is that it allows a selection of options, including hybrid options combining algorithms from different categories, to produce the most appropriate procedure. The technical goal is to quickly implement sub-optimization loops to facilitate the entire optimization process for the seismic reservoir simulation.

The optimizer consists of three components: optimization solvers, forward simulation wrappers, and simulation data converters. The forward simulation solver and simulation data converters are developed separately for reservoir property characterizer, reservoir simulator, petrophysical property characterizer, and 3D finite-difference simulator.

The Optimization Laboratory is implemented according to the workflow illustrated below. The wrappers are developed to aim for the smooth execution of each individual sub-problem. The sub-problems are illustrated as different color in the diagram. It is clear that each sub-problem involves one or more forward simulation processes that generate the predicted data from the optimization model parameters. Each sub-problem also involves solving an optimization problem.

The optimization component consists of several optimization algorithms in the form of executable programs. Each of these optimization wrappers offers the following functionality:

1) Able to obtain a model parameter update,
2) Able to perform interactive update as well as automatic update model parameters, and
3) Able to send and receive requests to and from other application wrappers including other optimization wrappers.

We have built three optimization algorithms in the OF Optimization Laboratory. They are a generalized linear solver (GLS), a generalized nonlinear solver (the modified LevenBerg-Marquardt Solver, LMDIF), and a constrained Genetic Algorithm solver (GENOCOP III). The GENOCOP III itself is often considered a hueristic, hybrid solution to some optimization problems. The GLS wrapper uses a defined data I/O format in conjunction with automatic scaling of columns of a Jacobean matrix, included with a control mechanism wrapper.

We have created a TCL/TK wrapper that drives the Eclipse and VIP reservoir simulator. We are able to loosely integrate the Eclipse and VIP wrappers with the Optimizer to perform production history matches.

We have written a suite of tools that implement both theoretical and empirical equations published in the literature to match impedances computed using various Biot-Gassman algorithms with observed impedances. We identified 11 key parameters to reproduce the complexity of inverted acoustic impedance. By integrating with the GL solver, we are able to optimize these constants to model the impedance changes from reservoir simulation results.

Visualization of Optimizer while Computing

Events are sent during the optimization loop so that a visualization of the convergences of the gradients and norms computed as the parameters are changed in the reservoir simulation.

2.3 OF Data Viewer

The OF 3D Data Viewer 2.3 (SDV) has been designed to 1) display a variety of geoscience data types registered in real-world coordinates in a common scene on the Web, 2) use state-of-the-art rendering methods, 3) run on all popular workstations, and 4) be easily extendable by other developers. The prototype displays seismic binned data (stack, migrated, acoustic impedance volume, etc.), surfaces and well logs. It is integrated into the OF Data Repository.

The reservoir is characterized by multiple sequential seismic surveys; seismic attribute volumes; many well logs of different types and vintages; geostatistically-derived data volumes on regular and stratigraphic grids; fluid saturation volumes; four-dimensional fluid-flow maps; fluid-interfaces, horizon, and fault surfaces and possibly other data types. Being able to view all these data—spatially registered with respect to one another in the local real-world coordinate system and rendered in a variety of modes so that the interrelationships can be perceived—is a great help and may be a necessity for understanding spatially complex reservoirs over time.

The OF uses the Visualization Toolkit (vtk). Vtk is freeware; its source code is available to anyone via internet download. It provides an interface to 3D graphics that is easy to use relative to OpenGL or other low-level interfaces. It is written in C++ and provides a well-documented C++API. It also provides an API to Java and the popular scripting languages Tcl/Tk and Python.

The SDV 2.3 has been developed to the point of visualizing binned seismic data (stacks, migrated volumes, attribute volumes, etc.), well logs and a computer-graphics ASCII file format known as the BYU format. Seismic data can be converted from SEGY and logs can be converted from one of the SigmaView formats.

The vtk and all the SDV 2.3 code is portable to Windows The development has been done on both SGI and Sun workstations with no problems other than some make file and environment variable peculiarities. Many people use vtk on NT or Linux on PCs. Because the top-level code is written in Tcl/Tk, it can be invoked from a web browser.

The SDV 2.3 is designed as a central framework and data-specific pipelines. A pipeline is a concept inherent in vtk. All data is processed by a pipeline consisting of the serial connection of a reader or source object to import the data in its native form, various filters to convert it into graphical form, a mapper to generate the graphics primitives, an actor to associate 3D transformations, colors, lights and other graphics properties with the data and a renderer to draw it all. The framework can operate with any one or more of the pipelines, and pipelines can be developed without access to the framework source code.

The center of attention in the SDV 2.3 is a single viewing window enclosed in a Tcl/Tk top-level window. All 3D objects are displayed in real-world coordinates here.

The main window has a typical menu bar across the top. The File, Edit and View buttons were placed on the menu bar by the SDV 2.3 framework. The BYU button was placed on the menu bar by the BYU pipeline. Since the GUI is written in Tcl script it is easy for pipelines to add objects to it without modifying the framework code.

The second main element of the framework GUI is a graphical data object tree.

This window shows the objects that are loaded into the SDV 2.3. The SDV 2.3 organizes data objects in a tree hierarchy. At the top level is the single instance of the SDV 2.3. Second in the hierarchy is a project. Under a project, the data objects are grouped by data type. The tree structure below the data-type level is determined by the data-specific pipeline. The hierarchy of the well logs and seismic views are different.

The right hand frame of this window is available for displaying information or GUI widgets associated with a single selected component of the tree. At present, the framework only prints the name of the object. A variety of data regarding various components can be associated with this selection.

The framework consists of the viewing window, a graphical data-object tree and the GUI widgets common to all data types. It is not modified by any of the data specific developers. In fact, only the C++ header files, the shared libraries, and the main tcl script is needed for developing new features. A new pipeline is added by adding one or a few lines to the .sdv_resource file, and informing the operating system where to find the tcl scripts and libraries containing the new pipeline code.

Vtk is distributed in source-code form so that it can be built on most common computers: most Unixes including Sun, SGI, HP, and AIX, Linux and Windows NT. It uses a hardware implementation of OpenGL if one is available on the host computer (Unix or NT) or software implementations of OpenGL, or a Windows-specific graphics language. It has some facilities for multiple graphics pipes such as are found in CAVE environments.

Vtk is maintained by Kitware, Inc. and is distributed from an ftp server at Rensselaer Polytechnic Institute. It requires a C++ compiler to "make" an executable version. Many examples are provided to allow the user to see how 3D objects can be visualized and to illustrate how the various classes can be used.

Vtk has APIs for Python and Java. We elected not to use Java since the Java version uses Java3D for its underlying graphics support. Java3D does not perform nearly as well as OpenGL at present. It may be an option in the future. Python is a much better-structured scripting language than is Tcl/Tk but is far less widely used. We have probably avoided many bugs by using Tcl/Tk. The decision to use Tcl/Tk needs to be reviewed periodically. A change from Tcl/Tk to Python would be straightforward. A change to Java would likely entail a complete recoding of the Tcl portion of the SDV 2.3 framework: less than ten pages of code at present.

3.0 THE DATA SERVICES LAYER

The OF persistent storage package (pio) is an important piece of the OF software because geological, geophysical and other data must be persistent in the OF loop. This persistence requires that data objects can be restored to their original form at any time.

The general idea behind our persistence design for the data repository is to serialize OF objects using XDR and then store the serialized objects in our repository. Our manager-server can be accessed by remote clients through the Web-based Active Notebook 1.1 controls. This feature allows a distributed workflow to pass object names or references among wrapped software applications.

3.1 Persistent Data Storage

The OF data object repository functions like an object database which stores and retrieves C++ objects. The storage for the OF data repository is the unix file system. A Unix directory is a physical repository. A repository directory has to have two index files: one called the object index file and another called the repository index. In actual implementation of the object repository, the pio object repository manages two another managers: the object index manager the and sub-repository index manager. The object index manager is responsible for adding, removing, renaming, and retrieving object descriptor and ensuring that the index file is consistent and persistent. The repository index manager is responsible for adding, removing, and retrieving a repository index object and making sure the repository index file is consistent and persistent. To guarantee consistency and persistency of the object repository, a centralized server is needed to maintain object index file and repository index file. Other issues such as security and transaction monitoring are handled by the Active Notebook.

The data repository client-server is implemented on top of the system socket layer. TCP/IP protocol is used for communication, that is point-to-point connection is guaranteed for each client. The data repository client-server has two high-level interface classes pioClient and pioServer. The class pioClient is the interface class for all applications and pioServer class is the interface class to pioRepositoryManager, which implements all functionality of the pio server.

Communication between the client and the server is implemented on top of the system socket layer. The communication protocol is TCP/IP. Data transferred is the either fixed-size or variable-size byte stream. On the client side, it creates a socket, binds the socket to the server address, then calls connect to make a point-to-point connection to the server. On the server side, it creates a socket, binds the socket to the IP address of the host, then listens for the client connection. As a client request comes in, it calls accept to create a temporary socket for that particular client. Data will be received through the socket returned from the accept call.

A client requests a service by sending a message. A request message consists of three parts: the first part is the request code, the second part is the client information which includes user name, machine name, process id, time stamp, and unique client id, and the third part is the parameters related to the request.

An exemplary sequence of communication on the client side is:

Send a request message;

Receive acknowledge if the requested service will be served by the server;

Send data if necessary (such add object to the repository); and

Receive acknowledge if request fulfilled.

The acknowledge message will be an integer which tells the client if the requested service succeeded or failed, and if it failed what caused it to fail.

An exemplary sequence on the server side is:

Receive a request;

Acknowledge the client if requested service available;

Receive data from a client if necessary such as add method;

Send data to the client such as get method; and

Send acknowledge to the client if the requested service fulfilled.

The pioServer uses pioObjRepositoryManager to do all work requested by a client. The pioObjRepositoryManager uses two index managers to manage the directories and files under a Unix directory. PioRepositoryIndexManager manages directories, and pioObjIndexManager manages object files.

The OF Data Repository has four high level components: the Repository Manager, the Object Descriptor Manager, the Persistence I/O Handler, and the XDR Streamer. The repository stores objects with the assistance of the Object Descriptor Manager, which maintains a table of indexed objects with their associated descriptions. The Persistence I/O Handler is responsible for the construction and casting of objects. It uses the XDR Streamer to serialize objects to files in XDR format, which are then stored in the repository. Note that the repository is a set of files stored in NFS. This concept is analogous to the repository of a source code versioning system such as CVS or RCS. The difference is that we store machine independent binary files (XDR format) representing serialized versions of objects.

pioRepositoryManager

A project repository is simply a Unix directory. The Repository Manager adds and removes objects into/out of the repository. It uses the Object Descriptor Manager to catalog the objects into the repository. Each project directory has one file, which contains a collection of descriptors (pioObjDescriptor) objects. These object descriptors have information about all objects stored in the repository. The Object Descriptor Manager class (pioObjDescriptorManager) adds, retrieves and deletes any object descriptor from the repository. In this implementation, each object is a single file in ASCII or XDR format. The static function to create an object of a defined type has to be registered in a registration table (String2PtrFuncMap) before the object is stored or retrieved from the repository. A typical session using the repository to add an object is demonstrated in the following code excerpt:

There is an object descriptor (pioObjDescriptor) associated with each of the objects stored in the repository. The Object Descriptor Manager
  (pioObjDescriptorManager) contains a singleton map:
  typedef         map<string, objDescriptor>string2ObjDescriptorMap That relates the object name to its descriptor. This manager essentially performs operations to add, remove and commit changes to the repository.

The Object Descriptor contains relevant information associated with the objects to be stored such as file format (ASCII or XDR), name, type, project name, id number, owner, time-stamp, object description and xdr version string.

Persistence I/O Handler

This component may be among the most important in this design. The Persistence I/O Handler is responsible for registration, construction, initialization, and proper casting of the stored objects. The Handler is a placeholder for the types that we want to store in the repository. The Handler uses XDR to serialize and write the objects into the repository. Reading the serialized objects from the repository is more complicated, because the Repository Manager does not know the type of the object it is going to read. The Repository Manager only has a string containing the object name. Therefore, it utilizes the string-to-pointer function map to locate the proper method to construct the object and return it as a pioObjBase pointer. This pointer is then cast (narrowed) by the user using the objCast method that is essentially a dynamic cast checking in addition to an object registry into the repository. It is not possible to retrieve unknown object types from the repository and if the user tries to retrieve an unregistered type then an invalid pointer (nil) is return. If the object is not registered at all an exception is thrown.

The xdrStream class wraps the XDR serialization functions for the fundamental built-in types in C++. The XDR was created by Sun Microsystems, Inc and is freely available. It is normally built in the libc of Unix systems for remote procedure calls. XDR provides a conventional way for converting between built-in data types and an external bit-string representation. These XDR routines are used to help implement a type encode/decode routine for each user-defined type. The XDR handle contains an operation field which indicates which of the operations (ENCODE, DECODE or FREE) is to be performed.

Wrappers

The OF is a computational system which involves many software applications from vendors as well as proprietary legacy codes from Western Geophysical. The OF workflow may involve many different asset team members working on many different applications which may be distributed on different machines in different countries that are connected through the network. Making trafficking and versioning among many applications in a workflow efficiently in uniform and synchronized ways is what this component wrapper does. A OF wrapper is like a black box that contains an application within. There are pipes connected to the both sides of box, one side is the input and the other is the output. One box can be connected to another box by connecting outputs of one to the input of another, as long as data types in and out of pipes are the same. Each pipe of the box is a port that is identified by name. There is only one type of data that is allowed to flow through the pipe, and that is defined by each application.

Each wrapper box has the following functionality. First it can execute the application as soon as inputs required by the application are all satisfied. Second, it sends events about the status of the execution to the event server. Third, it checks data types to match those coming through the pipe to those needed by the specific application. If the data type coming from another pipe is different from the data type required, then the wrapper invokes the appropriate formatting program to convert the data to the proper type, if there is a formatting program in the registry for the type of conversion required. Each wrapper is implemented in C++, and then compiled and tested for unix systems running on Sun, SGI and Linux operating systems.

Wrapper Registration

To wrapper a new vendor application, the application must be registered. This registration creates an application specification that is in the form of an appSpec object. This application spec object is stored in the data repository so that in the future, the wrapper can obtain information about this application. If the application reads and writes files, then information about these files must also be registered. This process is called to create a file specification in the form of a fileSpec object. This fileSpec object will also be stored in the data repository for the wrapper to use to obtain information about the kind of data needed in the pipe.

The srWrapper class is designed to be an automatic wrapper box. There are two kinds of I/O ports, the file port and parameter port. The file port indicates a file will be attached to the port. The parameter port means that port holds a parameter value such as a string, integer, float etc.

The srWrapper class provides mechanisms to create a box, add input and output ports, set values for the port, connect ports from one wrapper to another, and execute the application. It also provides the query mechanism to allow the user to ask the box to obtain information about what is going on inside the box.

3.2 Events

The OF (Operating Framework) software is an integrated, distributed system that seamlessly connects (or includes) many vendor applications and codes. A typical OF job involves many vendor programs running at any particular time. In traditional computer applications, such as sequential batch processing, the user of each is responsible for monitoring the status of his job. There is normally no communication among individual application programs. In our OF, we have built an event handler to monitor the progress and status of each of the processes.

A OF event is a piece of information generated from the client application. This information is delegated to interested parties who are expecting such information. For example, if one wants to visualize intermediate results when running a simulation, then the OF simulator can send an event to the visualizer. Also the data object can be delivered to the other application.

The Event Handler 2.1 keeps books on all information vital to the end-users and synchronizes multiple executions. The synchronization is achieved through the Event Handling Service by utilizing a centralized messaging system that allows all job processes to communicate with each other and report their status and exceptions. The Event Handler 2.1 is implemented as a centralized server which uses sockets to communicate with clients. The event handler server can register clients as either event producers or event consumers.

Our implementation of the event handler client-server uses a "poll" model. That is, the client has to poll the server to find the data in which it is interested. Produced events are stored on the server for interested parties to fetch. This is the so-called "polling-model". In addition, events can be pushed back to the clients who are listening, this is so-called "push-model".

There are five (5), different parts of the EE component. The EE client is for applications to send and receive events. The EE server serves all EE clients and manages events. The event manager provides APIs to the event server. The producer manager provides APIs for the event manager to manage from producers, and the consumer manager provides APIs for the event manager to manage for consumers.

The event client is designed for applications to communicate with the event server through the TCP/IP connection. This client provides all necessary APIs for an application to send and receive events and to do queries. A client first has to register itself as a producer or consumer. To produce events, the client must be registered as producer, then adding events to the server is granted. To consume events, the client must be registered as consumer, then the client can poll the server about events it is interested in. Also the client can tell the event server what events it is interested in or producers it is expecting events from. Then the sever can push events back to the registered consumers.

The Event Server is a service provider that serves event clients. It is responsible to register clients, manage events, answer client's queries, push events back to registered clients, etc. The server depends on the event manager to do all the work. The event manager then further manages two other managers, producer manger and consumer manager. The producer manager is responsible for the addition of events from the client to the event queue, and retrieval of events for consumers. The producer manager manages a list of producer, and each producer will then manage an event queue and a consumer queue. Events produced by this producer are queued to the event queue which has a priority protocol of first-in-first-out (FIFO). All consumers who are interested in this producer are queued on the consumer queue. The consumer manager manages a list of consumers registered on the server. Each registered consumer then manages its own event type queue and producer queue. The event type queue stores all event types this consumer is interested in, and the producer queue stores producers interested by this consumer. There are two version of EE server implemented: single thread and multi-thread. The latter is designed to handle multiple clients at the same time.

OF is an environment built upon fundamental "Lego" blocks called foundation classes 3.3. The API of each of these classes is exposed to scripting languages such as Tcl, Python, Pearl and Java, allowing fast prototyping of new applications and tools. For example, the Active Notebook 1.1 development draws heavily from these packages through the Tcl scripting language. We followed the STL design for most of the packages, which is divided into containers and algorithms/filters.

Util (OF Utility) Package

The util package provides a set of C++ classes categorized into data containers, such as arrays, algorithm classes related to containers, and utility classes for string, system and resource information, unix file and directory manipulation, and pattern matching.

Data containers are arrays of up to 6 dimensions. Matrices and base array classes are generic numerical arrays and are derived from generic arrays. Numerical array classes have overloaded numerical operators such +, −, *, /, += etc. The same design rule applies to matrix in both 2D and 3D.

Our class strings are a subset of the standard string class provided by the C++ language. However, ours have some special string manipulation methods widely used by all OF packages. The pattern matching class does pattern matching. The class SystemInfo allows the application to obtain system information such as time, login name, system resource information etc. The class FileInfo allows applications to get information about a unix file. The unixDirUtil class is used to generate file name tree structures of a unix directory. Algorithm classes are related to each data container. One design rule for OF util classes is that we separate containers from algorithms. This design makes container classes more reusable in the future.

The SRFC package contains the foundation classes 3.3 that implement a set of data containers for specific geological and geophysical datasets. Typical data types used in all geological and geophysical softwares are volumetric data (3D seismic, 3D velocity, etc), well data including well culture data, well bore (well path geometry), well logs, well pick, zones, perfs, time-depth conversion tables, velocity tables, cores. Other data types are horizon, fault, reservoir model and various tables used in the fluid simulation software. Since these data used many different packages with very different formats, an internal format for each data type described is desired in the OF system. Currently srfc package provides containers for all these data types. These containers is only used to hold data with help of access (get methods) and manipulation (set method) to communicate with the object. There is no algorithms implemented for these containers. Algorithms are implemented in the package filter 3.6. This design will make these containers extensible and reusable in the future.

3.4 MultiMesh System

Many OF data types consists of two different kinds of data: geometry and associated attributes. Correct registration of attributes with geometry is a critical part of the OF system. This registration is implemented with help of the a shared earth model (CGC) and multimesh system 3.4 (mms) developed by Ulisses Mello of IBM. The CGC system creates and maintains a topological representation of an earth model that is be used as the reference model in each OF project. The mms 3.4 provides containers for all different kinds of geometry objects and meshes needed by applications such as point, polyline, surface, polygons, tetrahedra, bounding box and more. To associate the srfc container with the geometry, a set of field classes is implemented in this package. These fields are generally designed for 2D and 3D structured and non-structured datasets. The 2D structured fields are mapped horizons and faults, 2D non-structured fields are triangulated horizons and faults. 3D structured fields include regular, rectilinear and curvilinear fields. The 3D non-structured field is an irregular mesh. These field containers are like srfc containers. They are objects to store geometry and attributes. Available APIs are set and get methods only. Each field class has methods to encode and decode for overloaded xdr input and output streams.

The high-level architecture of our modeling framework is a layered architectural software pattern in which each layer has a distinct role in the framework. In the base of the framework, we use a topological representation based on the Radial Edge Data Structure—REDS—which is used to represent complex non-manifold topologies. REDS explicitly stores the two uses (sides) of a face by two regions that share the same face. Each face use is bounded by one or more loops uses, which in turn are composed of an alternating sequence of edge uses and vertex uses. The REDS is general and can represent non-manifold topology. We make extensive use of high level topological operators for building earth models because topological data structures are in general too complex to be manipulated directly. Edges of REDS may represent well paths, a set of faces or a shell may represent the surface of a fault or seismic horizons, and set of regions may represent geological layers and fault zones. The associated meshing and remeshing of these geological objects is based on the connectivity and spatial subdivision information stored in REDS.

The Multimesh MMS Package

We implemented the REDS and its topological operators using C++, and this implementation is very compact, having less than 50 C++ classes. The REDS is the component that stores the topological and geometrical representation of an earth model. MMS is the layer that generates and manages numerical meshes associated with earth model sub-regions. It is important to note that meshes are treated as attributes of geological entities such as blocks, horizons, layers and faults. Hence, a mesh is not the model, but only one possible realization of a model or a sub-region of the model. Using CGC and MMS 3.4, the meshing operators can provide multiple mesh representations with multiple resolutions of a given earth model. One particular important application of these operators is in the area of OF where it is commonly necessary to upscale geological grids to a resolution that the flow simulation can be executed in available computers. Operations between coarse and fine resolution grids are greatly facilitated in this framework.

In order to share geological information among the various applications used in OF, a shared earth model builder was implemented (CGC). An earth model is built from a set of polygonal surfaces defining the boundaries of geological structures. CGC has various geometrical operators built-in to facilitate the creation of proper 3D representations of geological entities such as faulted reservoirs.

The structural seismic interpretation of the reservoir provides the geometrical elements (set of polygonal surfaces) necessary to create a reservoir earth model and its spatial subdivision. The geometrical and topological description of an earth model is obtained incrementally by adding polygonal surfaces sequentially to the model. The resulting earth model contains the space partitions (regions of space) defined by these surfaces. Meshes can be generated for the entire earth model as well as for each individual region of the model. Each region can have multiple meshes with various resolutions associated with it (below). These region meshes are treated as attributes of the model's region similarly to other physical attributes such as lithology, density and velocity. In the current implementation, a region maintains a list of the name (String) of the mesh objects associated with it. These meshes are stored in the OF repository and can be easily queried and retrieved by name.

It is important to realize that this framework also allows us to manipulate voxel representations (regular meshes) of the earth model with great flexibility. For example, we treat 3-D seismic volumes as regular grid attributes of the earth model. Because the earth model has explicit information of the geometry of geological objects in the model, we can easily select, for example, only the seismic voxels of a particular reservoir object.

Meshes necessary as input for some of the OF applications are generated automatically by the MultiMesh System. This system was designed to integrate and transfer information in numerical meshes among applications that require distinct mesh representations. The meshes are discrete realizations of the earth model. This is analogous to the OF process in which each reservoir realization is just a possible representation of the reservoir. A particular mesh (regular, curvilinear or tetrahedral is just a possible representation of the earth model). Multimesh is able to generate structured (regular and rectilinear) and non-structured (tetrahedral) meshes. It can manipulate all meshes necessary to integrate applications (Eclipse, FDM, EarthGM). IBM has contributed to building reservoir classes (SRFC) on top of some MultiMesh classes, and final work will focus on the integration of Multimesh with other applications.

The design of the mesh classes in MMS 3.4 has been influenced by the design of the VTK mesh classes. However, our field classes are much more flexible. We made the decision to have mesh design close to VTK's because it makes simpler to create VTK mesh objects for visualization.

3.5 SRIO OF Data Input and Output Package

Sources of the OF data are from an Application Pool 3.7 that may include software such as traditional interpretation applications (e.g., Landmark, GeoQuest), complex seismic data processing software (e.g., RAI 3.9, OMEGA 3.13), OF software (e.g., EarthGM 3D 3.8), fluid simulation software (e.g., VIP 3.11, ECLIPSE 3.12), visualization software and many others (e.g., 3DEFDSS 3.10). These applications take different data formats as input and generate many different data formats as output. The OF loop is a large optimization system that incorporates many datasets to generate the best reservoir models. It is impractical and also impossible to implement OF software that takes into account every possible data format. We have built an OF software that operates on well-designed and often used data objects, but other data types must be convert to the internal data types. The SRIO library serves this purpose. The SRIO package consists of a set of classes that define public APIs to all applications, and derived classes for each different application software package. Every class has two APIs: read and write. The read method reads client data and converts to SRFC or MMS 3.4 objects. The write method converts SRFC or MMS 3.4 objects into client data format.

3.6 Filter OF Data Filtering Package

Packages like SRFC do not provide any APIs to manipulate those data objects. For example, well bore data usually comes with (x, y) coordinates plus vertical depth and measured depth, but a well bore with two-way travel time is often used when comparing with seismic data. To get two-way travel time, a time-depth conversion table and algorithm are needed. Another example is mapping data to a horizon, this process involves two different data objects: horizon and volumetric data. An interpolation algorithm has to be implemented to obtain data for each point of the horizon. The filter package provides a set of classes to filter specific data from OF container objects algorithmically to satisfy the above described is requirements.

Those of ordinary skill in the art will understand that while the foregoing description of the invention has set forth certain illustrative embodiments, the present invention is not limited by the exemplary embodiments set forth herein. In particular, the recitation of certain embodiments in connection with particular computer operating systems or networks or particular analytical applications is non-limitative, and it is a specific advantage of the present invention that it may be readily adapted for use across a wide variety of system, network, and computer language configurations by those of ordinary skill in the art, and that it may be implemented to harmonize the operation of a number of disparate characterization-related applications, including legacy systems as well as future-developed analytical and characterization applications. Similarly, the recitation of the advantages of using the present invention in conjunction with seismic characterization data input does not limit the ability also to implement the system with non-seismic reservoir data. Thus, the illustrative embodiments set forth herein do not limit the spirit and scope of the present invention, which is limited only by the following claims.

We claim as our invention and desire to secure protection for:

1. A method for analyzing information relative to the time-varying state of a plurality of substances within a subsurface petroleum reservoir, comprising the steps of:
   (a) providing data relative to the physical state of at least one fluid within the reservoir;
   (b) making at least a portion of said data available for analysis by each of a plurality of computational applications for characterization, by said applications, of traits relating to at least one of:
      (1) the location;
      (2) the state; and
      (3) the volume quantity of the at least one fluid;
   (c) performing additional computational analysis on data, (including output data from said plurality of computational applications in step (b), to optimize said characterization of fluid traits;
   (d) monitoring change over time in at least one of:
      (1) said data;
      (2) said characterization, and
      (3) characteristics of the optimization of step (c) to create a historical data profile associated with the characterization of the reservoir data;
   (e) storing at least a portion of said data and its associated historical data profile; and
   (f) making said data and data profile accessible over a distributed network, whereby persistent availability of said data and characterization-related information for the reservoir is permitted.

2. The method of claim 1, wherein said data is storable in a plurality of data formats, and wherein data relating to a plurality of reservoir areas is made searchably available through said distributed network in conjunction with associated unique reservoir area identification indicator for said stored data.

3. The method of claim 2, wherein at least a portion of said data is made selectively available for withdrawal by a software application for analysis, and wherein data tracking is provided whereby said withdrawn data is returned to a correct storage area and is provided with updated data identification indicator.

4. The method of claim 3, wherein new data content for said distributed data network is dynamically created automatically using software scripts.

5. The method of claim 1, in which an optimization tool kit is automatically deployed to select most-likely locations of error in said analysis of said data, wherein said optimization tool kit implements sub-optimization loops between said plurality of computational applications, performing analysis to estimate error using error optimization techniques.

6. The method of claim 5, wherein a fluid flow simulation application wrapper is provided for connectivity between said optimization tool kit and said plurality of computational applications.

7. The method of claim 5, wherein said optimization tool kit is implemented in conjunction with a set of algorithms for computing seismic impedance from a plurality of reservoir rock and fluid parameters, whereby differences between observed and computed seismic impedance for the reservoir can be diminished using said set of algorithms.

8. The method of claim 7, whereby a user is provided with the option of varying at least one of said plurality of reservoir parameters, and wherein a visualization of modeled change in seismic impedance as a result of said varying is provided over said distributed data network, whereby the user is enabled to evaluate impedance data convergence by use of said visualization.

9. The method of claim 1, wherein a three-dimensional graphic display based on data from said plurality of computational applications is accessible through said data network, and wherein said display includes portrayal of locations within the reservoir mapped using locational coordinate data, whereby dynamic display of a time-varying seismic survey for the reservoir may be provided.

10. The method of claim 9, wherein a persistent data services layer is provided for storing versions of at least a portion of said data and characterization-related information during operation of the method, wherein data objects are serialized and versioned, and wherein a user may remotely view said versions over said distributed data network; said persistent data services layer comprising:
   (i) a server;
   (ii) a repository manager,
   (iii) a data object description manager;
   (iv) a persistence input/output handler; and
   (v) a streamer.

11. The method of claim 1, wherein software application wrappers are provided for coordination of the operations of said plurality of computational applications, said software wrappers comprising software scripts operational (I) to check input data integrity and (II) to call upon functions of said computational applications, said software wrappers further operational (III) to provide notification of completion of an analysis task for said computational applications.

12. The method of claim 1, wherein an event handler is provided for receiving events generated by said computational applications, and wherein said event handler is in periodic communication with said computational applications through polling.

13. The method of claim 12, wherein event clients are generated by the event handler to communicate with an event server through a data connection.

14. The method of claim 12, wherein an event server is provided and is operational for performing a plurality of tasks selected from the group consisting of: (i) registering a plurality of clients, (ii) managing events, and (iii) answering queries from events, and wherein said event server pushes events back to the registered clients using first-in-first out protocols.

15. The method of claim 1, wherein the method is implemented in conjunction with a computational framework comprising foundation classes capable of responding to a plurality of scripting languages, and wherein said foundation classes can be assembled for rapid prototyping of new functionality of said method.

16. The method of claim 15, wherein a utility package of foundation classes is provided for at least one task selected from the group comprising: (i) holding data arrays; (ii) storing and executing algorithms; (iii) storing and executing mathematical strings; (iv) storing resource information; (v) storing and applying unix file descriptors; and (vi) pattern matching, and wherein said utility package can be used to generate new tasks for execution in conjunction with the method.

17. The method of claim 15, wherein a set of data containers comprising geoscience-specific foundation classes is provided for storage of data selected from the group consisting of: (i) 3D sesimic data; (ii) wellbore geometry and log information; (iii) time-depth conversion tables; (iv) velocity volumes; (v) geological horizons and faults; and (vi) fluid flow descriptors for simulation models.

18. The method of claim 17, wherein package filters are provided and are operational to manipulate said data containers algorithmically.

19. The method of claim 15, wherein a set of classes are provided for defining public application program interfaces to said plurality of computational applications, and wherein both input and output data classes are described for each of said computational applications.

20. The method of claim 1, wherein said data comprises geometric data and associated attributes, and wherein said data is associated with a shared earth model through use of a multimeshing application to provide a topological representation of the reservoir, and wherein said multimeshing application is provided with data containers for geometry data objects and meshes for use by said computational applications.

21. The method of claim 20, wherein said topological representation is implemented using a radial edge data structure operational to represent complex, non-manifold topologies.

22. The method of claim 20, wherein upscaling and downscaling of reservoir simulation meshes is executed in conjunction with said topological representation of the multimeshing system.

23. The method of claim 20, wherein said multmeshing application manipulates voxel information using information derived from said radial edge data structure.

24. The method of claim 20, wherein said shared earth model is built by said multimeshing application at least in part from a set of polygonal surfaces including geometrical and topological elements.

25. The method of claim 20, wherein data relative to individual components of the shared earth model are made available to external software applications according to specific meshing and data input/output requirements of said external software applications.

26. The method of claim 1, wherein said distributed data network comprises an internet connection integrated with functions of said computational applications, and wherein said connection is operative for data input, output, and request functions for said computational applications.

27. A system for analyzing information relative to the time-varying state of a plurality of substances within a subsurface petroleum reservoir, comprising:

(a) a computer server comprising a memory and a processor;

(b) at least one input device to provide data relative to the physical state of at least one fluid within the reservoir;

(c) a data communication path by which at least a portion of said data can be made available for analysis by each of a plurality of computational applications for characterization, by said applications, of traits relating to at least one of:
  (1) the location;
  (2) the state; and
  (3) the volume quantity of the at least one fluid;

(d) computer programming operational for performing additional computational analysis on data, including output data from said plurality of computational applications in element (c), to optimize said characterization of fluid traits;

(e) computer programming operational to monitor change over time in at least one of:
  (1) said data;
  (2) said characterization, and
  (3) characteristics of the optimization of element (d) to create a historical data profile associated with the characterization of the reservoir data;

(f) computer programming for storing at least a portion of said data and its associated historical data profile in said memory; and (g) a data link to a distributed data network, for making said data and data profile accessible to at least one user remote from said server, whereby persistent availability of said data and characterization-related information for the reservoir is permitted.

* * * * *